US010309056B2

(12) United States Patent
Devidal

(10) Patent No.: US 10,309,056 B2
(45) Date of Patent: Jun. 4, 2019

(54) METHOD FOR HEAT TRANSFER ONTO TEXTILES AND EXPANSIBLE MULTILAYER COMPLEX THEREFOR

(71) Applicant: CHOMARAT TEXTILES INDUSTRIES, Le Cheylard (FR)

(72) Inventor: Dominique Devidal, Saint Agreve (FR)

(73) Assignee: CHOMARAT TEXTILES INDUSTRIES, Le Cheylard (FR)

(*) Notice: Subject to any disclaimer, the term of this patent is extended or adjusted under 35 U.S.C. 154(b) by 0 days.

(21) Appl. No.: 15/566,807

(22) PCT Filed: Apr. 14, 2016

(86) PCT No.: PCT/FR2016/050876
§ 371 (c)(1),
(2) Date: Oct. 16, 2017

(87) PCT Pub. No.: WO2016/166489
PCT Pub. Date: Oct. 20, 2016

(65) Prior Publication Data
US 2018/0105980 A1     Apr. 19, 2018

(30) Foreign Application Priority Data
Apr. 16, 2015   (FR) ...................... 15 53360

(51) Int. Cl.
*D06Q 1/12*      (2006.01)
*B32B 5/20*      (2006.01)
(Continued)

(52) U.S. Cl.
CPC ................. *D06Q 1/12* (2013.01); *B32B 5/02* (2013.01); *B32B 5/022* (2013.01); *B32B 5/18* (2013.01);
(Continued)

(58) Field of Classification Search
CPC .. D06Q 1/12; B44C 1/162; B44C 1/17; B44C 1/1712; B44C 1/172; B32B 5/18; B32B 27/065; B32B 27/40
(Continued)

(56) References Cited

U.S. PATENT DOCUMENTS

| 5,667,614 A | 9/1997 | Stahl |
| 2012/0015162 A1 | 1/2012 | Lion et al. |

FOREIGN PATENT DOCUMENTS

| EP | 0075832 A1 | 4/1983 |
| EP | 0304550 A2 | 3/1989 |

(Continued)

OTHER PUBLICATIONS

International Searching Authority, International Search Report (ISR) and Written Opinion for International Application No. PCT/FR2016/050876, dated Aug. 26, 2016, 14 pages, European Patent Office, Netherlands.

*Primary Examiner* — Bruce H Hess
(74) *Attorney, Agent, or Firm* — Alston & Bird LLP

(57) ABSTRACT

The invention relates to a method allowing the heat transfer of a multilayer complex (1) onto the front face of a textile material (13), said multilayer complex comprising a layer (5) containing polyurethane and a superimposed expansible layer (6) containing a gelled vinyl polychloride plastisol and a non-expanded heat-expansion agent. To this end: the multilayer complex is placed on the visible front face of the textile material, the polyurethane-containing layer being the furthest away from the textile material so as to form, after the transfer, a visible decorative layer on the front face of the textile material; and temperature and pressure conditions are applied so as to cause the adhesion of the multilayer complex to the visible front face of the textile material and the simultaneous expansion of the expansible layer. A three-
(Continued)

dimensional edge effect can be obtained using different color layers.

13 Claims, 3 Drawing Sheets

(51) Int. Cl.
    *B32B 27/06*     (2006.01)
    *B32B 27/40*     (2006.01)
    *B44C 1/17*     (2006.01)
    *B32B 5/02*     (2006.01)
    *B32B 7/06*     (2019.01)
    *B32B 27/36*     (2006.01)
    *B44C 1/16*     (2006.01)
    *B32B 5/18*     (2006.01)
    *B32B 7/04*     (2019.01)
    *B32B 29/00*     (2006.01)

(52) U.S. Cl.
    CPC .................. *B32B 5/20* (2013.01); *B32B 7/04* (2013.01); *B32B 7/06* (2013.01); *B32B 27/065* (2013.01); *B32B 27/36* (2013.01); *B32B 27/40* (2013.01); *B32B 29/00* (2013.01); *B44C 1/162* (2013.01); *B44C 1/1712* (2013.01); *B32B 2255/10* (2013.01); *B32B 2255/26* (2013.01); *B32B 2262/0276* (2013.01); *B32B 2262/062* (2013.01); *B32B 2262/08* (2013.01); *B32B 2264/00* (2013.01); *B32B 2266/0235* (2013.01); *B32B 2307/30* (2013.01); *B32B 2307/41* (2013.01); *B32B 2307/732* (2013.01); *B32B 2307/75* (2013.01)

(58) Field of Classification Search
    USPC ......... 428/32.75, 32.77; 156/240; 427/372.2, 427/389.9; 42/372.2, 389.9
    See application file for complete search history.

(56) References Cited

FOREIGN PATENT DOCUMENTS

| | | |
|---|---|---|
| EP | 2298985 A1 | 3/2011 |
| EP | 2418077 A1 | 2/2012 |
| EP | 2425050 A2 | 3/2012 |
| GB | 2329348 A | 3/1999 |
| WO | WO 2000/015444 A2 | 3/2000 |
| WO | WO 2010/125295 A2 | 11/2010 |

METHOD FOR HEAT TRANSFER ONTO TEXTILES AND EXPANSIBLE MULTILAYER COMPLEX THEREFOR

CROSS REFERENCE TO RELATED APPLICATIONS

This application is a national stage application, filed under 35 U.S.C. § 371, of International Application No. PCT/FR2016/050876, filed Apr. 14, 2016, which application further claims priority to and the benefit of French Application No. 1553360, filed Apr. 16, 2015, the contents of both of which as are hereby incorporated by reference in their entirety.

BACKGROUND

Technical Field

The invention relates to the textile industry, and more particularly to applying a marking or a decorative motif onto a textile article by using the heat transfer technique. The invention is more particularly applicable to the sectors of clothing, footwear, leather goods, sports articles, or advertising articles.

Description of Related Art

In those sectors, or for other applications, it is known that markings or decorations can be formed on textile articles by using a heat transfer technique.

For that purpose, transfer films are generally used that are heat-fusible, that are pre-cut to the shape of the marking or of the motif to be applied, that are placed on the textile, and that are fused, thereto by being heated by means of a smoothing iron or more preferably by means of a heater platen press.

Such "heat transfer" decoration products are conventionally in the form of a flat and single-layer film, of homogeneous composition.

Some of them are dyed in the mass, and are therefore single-color products. Only appropriate cutting out then makes it possible to obtain a variety of motifs.

Others can be printed digitally by special ink-jet machines, and then cut out, which makes it possible to obtain much more varied multicolor motifs. Conversely, the resulting decorations remain flat and without any relief.

Heat-transferable multicolor decorative complexes are also known, such as, for example, those described in the Applicant's prior patent applications EP 2 298 985 and EP 2 425 050, that comprise a plurality of superposed technical layers, e.g. a backing layer, a colored (decorative) layer, an opacifying layer, and a heat-fusible layer.

However, those layers are of very fine thickness in the manner of a film, and the overall thickness of the resulting multilayer complex remains very small. In addition, the decorative effect is limited to a single layer, referred to as the "colored layer". After it has been transferred onto to the textile, the resulting decoration is therefore flat and without relief.

Transferable decorations that have relief, flocking, for example, are known that are single-layer and monochromatic.

Document GB 2 329 348 also discloses a multilayer motif that has relief, and that must be fastened to a garment by high-frequency welding.

That motif is constituted by a lower layer that is made of PVC, polyurethane, or acrylic, that does not contain any plasticizer, and that is placed against the garment during fastening to the fabric, by an intermediate layer made of expanded PVC to give relief to the resulting assembly, and by an upper layer made of non-expanded PVC that can be flocked electrostatically.

The lower layer, which is optionally based on polyurethane, has the function of preventing the dyestuff from migrating from the garment to the motif. It is not a printable decorative layer, but rather it is an impermeable protective barrier that must be placed between the fabric and the PVC motif so as to perform its role as a barrier. With that method as described, the lower layer must be placed against the fabric and it is therefore not visible once the transfer has been made.

In addition, the expansion of the PVC intermediate layer takes place while it is being manufactured, before it is applied to the garment. The resulting motif is already in relief, and cannot therefore be printed subsequently to it being manufactured.

Single-layer products are also known that are expandable upon application of heat, and that swell in the transfer press. The resulting decorations are in relief, but they remain single-color. When it is attempted to print them prior to them being transferred, the subsequent swelling of the material causes the color rendering to be attenuated, with the colors then becoming pale, and the drawing or design being imprecise, giving the resulting decoration an appearance that is not aesthetically pleasing.

Finally, Application WO 00/15444 discloses a transfer element that comprises a layer that is expandable upon application of heat and that is made of plastisol or of puff ink, and a larger transfer sheet that is heat-fusible, or that bears a material that is adherable upon application of heat.

That transfer element is placed inside a garment, its expandable layer being applied against the non-visible inside face of the garment, and being interposed between the fabric and the transfer sheet, and then the resulting assembly is heated by a press. The edges of the transfer sheet adhere to the garment, and the expandable layer swells, thereby forming relief that is visible through the garment.

With such a transfer method, none of the layers of the element are visible after the transfer, because they are all situated under the garment. A relief effect can only be obtained through the textile. It is therefore impossible to achieve a decorative layer, in particular a printable layer, that is visible on the front face of the textile once the transfer has been made. Similarly, it is impossible to obtain a border. In addition, the transfer element described does not have any polyurethane-based layer.

BRIEF SUMMARY

Thus, with known swell products, it is impossible to obtain, on the edge face of the expanded product, a color that is different from the color of the upper face of the decoration.

It is therefore particularly desirable to provide a novel heat transfer method and a product that is heat-transferable by using such a method, making it possible to obtain a decoration in relief, with bright and varied colors, having any precise drawing or design that can be set off advantageously by means of a different color at the edge face.

The invention provides such a method and such a product that, in addition, remains flat before it is heat-transferred onto the textile, thereby making it possible to store it, to transport it, optionally to print it, to cut it out, and to apply it very easily, as easily as a conventional flat product of the heat-transferable single-layer film type. Advantageously, the product of the invention swells only during the transfer operation, and preferably simultaneously with said transfer operation and by means of the heat applied for causing it to adhere to the textile material by heat-fusing.

The invention provides a heat transfer method for transferring onto a textile a multilayer complex formed of a plurality of superposed thermoplastic layers, including a layer based on polyurethane, and an expandable layer containing a gelled polyvinyl chloride plastisol and a non-expanded heat-expandable agent, in order to form a marking or a decoration on said textile.

Said method comprises the following steps: placing the multilayer complex on the visible front face of the textile, its polyurethane-based layer being the layer that is the furthest away from the textile so that, after transfer, it constitutes a visible decorative layer on the visible front face of the textile; and applying temperature and pressure conditions that cause the multilayer complex to adhere to the visible front face of the textile and simultaneously cause its expandable layer to expand.

In an embodiment of the invention, for said method, a multilayer complex is used in which the polyurethane-based layer and the expandable layer are of two different colors so as to create a border effect around the decorative layer, visible on the front face of the textile once the expandable layer has expanded.

In an embodiment of the method of the invention, before the multilayer complex is placed on the visible front face of the textile, it is prepared such that it has the shape or the motif of the marking or of the decoration to be formed on the textile.

In an embodiment of the method of the invention, the step of preparing the multilayer complex comprises at least one operation chosen from among the following operations: printing a motif on the polyurethane-based layer, cutting out, and waste stripping.

In an embodiment of the method of the invention, said temperature and pressure conditions are obtained by means of a heater platen press for performing transfer onto textiles.

In a preferred embodiment of the method of the invention, said temperature and pressure conditions correspond to a temperature lying in the range 160° C. to 170° C., and to a pressure in the vicinity of two bars, and they are applied for a duration lying in the range 10 seconds to 30 seconds.

The invention also provides a multilayer complex that is heat-transferable onto the visible front face of a textile by such a transfer method. Said complex is formed of a plurality of superposed thermoplastic layers, and comprises at least: a polyurethane-based layer designed to be the visible upper decorative layer, once the multilayer complex has been transferred onto the visible front face of the textile; and an expandable layer, containing a gelled polyvinyl chloride plastisol and a non-expanded heat-expandable agent.

In addition, the polyurethane-based layer and the expandable layer are preferably of two different colors so as to create a border effect around the decorative layer once the expandable layer has expanded.

In an embodiment of the invention, the polyurethane-based layer is opaque, dyed, or printable.

In a preferred variant of the invention the heat-expandable agent comprises microspheres constituted by thermoplastic casings enclosing a gas.

In a preferred variant of the invention, the expansion temperature range of the heat-expandable agent is compatible with a heat transfer temperature at which the multilayer complex is transferred onto a textile.

In an embodiment of the invention, the multilayer complex further includes one or more layers chosen from among: a heat-fusible layer, a backing layer, and an opacifying layer.

In an embodiment of the invention, the multilayer complex includes a heat-fusible layer based on a co-polyester or on polyurethane.

In a preferred embodiment of the invention, the multilayer complex includes a backing layer based on polyester, and treated to be non-stick.

The superposition, in the same heat transfer complex, of a decorative layer and of an expandable layer, which layers are of different compositions and of different thermal behaviors, with expansion and shrinkage that are different under the effect of heat and of cold, might, at first sight, seem uncertain to the person skilled in the art who naturally expects to encounter interfacing problems when heat-transferring the multilayer complex onto the textile, and in particular delamination or appearance of bubbles between the two layers and/or embossing of the motif that is displeasing in appearance. Naturally, the fact that one of the two superposed layers swells upon application of heat while the other remains unchanged further increases the doubts of the person skilled in the art as to the result that can be obtained and tends to discourage said person from continuing in that direction.

However, surprisingly, by means of the choice of the particular types of these two superposed layers in the complex of the invention, the composition of one of them being based on polyurethane and the composition of the other one being based on a gel polyvinyl chloride (PVC) plastisol and a non-expanded heat-expandable agent, the defects that the person skilled in the art naturally expected are avoided. No delamination, or any air bubble appear between the layers during or after the heat transfer operation, and the resulting motif does not have any embossing of displeasing appearance.

Although it is multilayer, the complex, once transferred, looks like a one-piece three-dimensional product, with a smooth decorative upper face that adheres very well to a thickness that can advantageously be of a different color in order to reinforce the visual effect of relief by a border effect.

The multilayer complex of the invention thus unexpectedly succeeds in solving the technical problem, while retaining all of the advantages of the various prior solutions but without suffering from their drawbacks.

BRIEF DESCRIPTION OF THE FIGURES

Other characteristics and advantages of the invention appear on reading the following detailed description given with reference to the accompanying drawings, in which.

Equivalent elements shown in the various figures bear like numerical references.

Naturally, the dimensions, and in particular the thicknesses shown in the figures for the various layers of the multilayer complex of the invention are given merely by way of illustration. They may be significantly different from the thicknesses observed on the real products and they have been considerably exaggerated to enable the invention to be shown and to be understood.

DETAILED DESCRIPTION OF VARIOUS EMBODIMENTS

Figure 1:
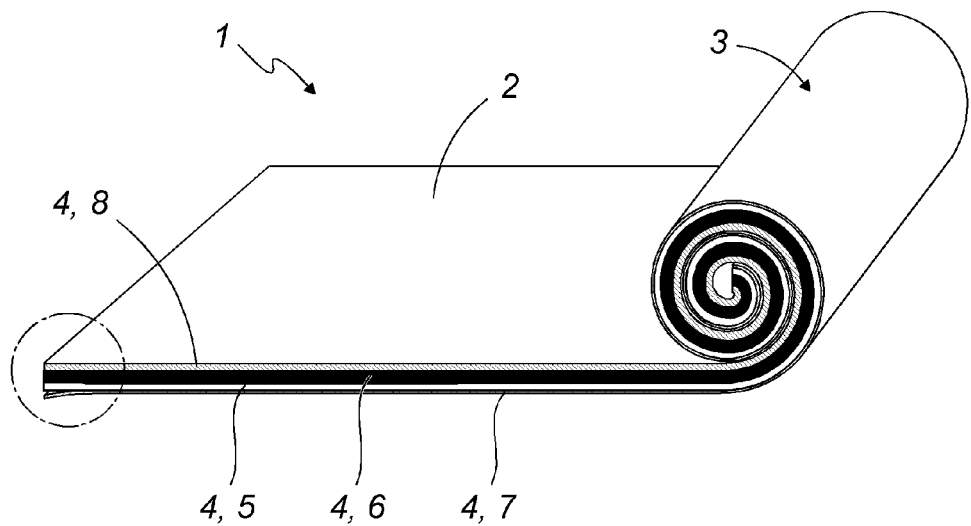
FIG. 1 is an overall perspective view of an example of a multilayer complex of the invention, as rolled up.
Figure 2:
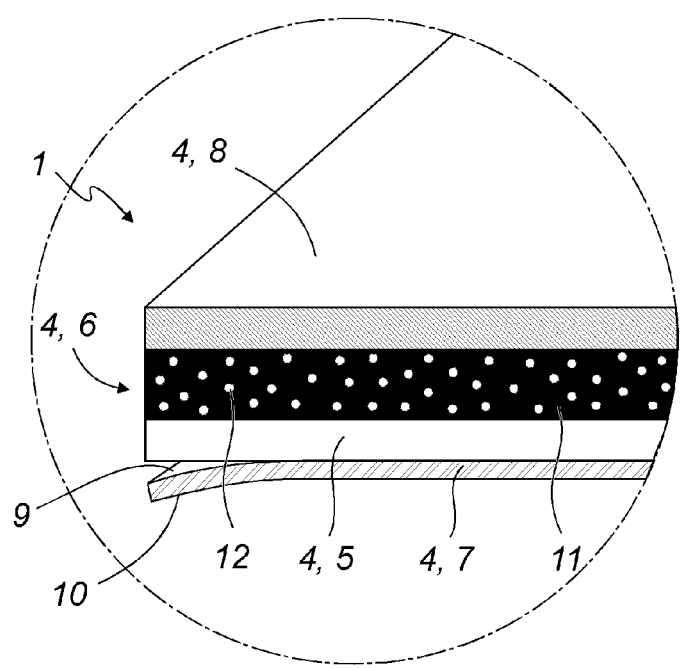
FIG. 2 is a diagrammatic enlargement of the encircled detail of the multilayer complex of FIG. 1 that shows the composition of its various different layers more precisely.

FIGS. 1 and 2 show an example of a multilayer complex 1 of the invention. As shown in FIG. 1, said complex is advantageously manufactured and sold in the form of a wide strip 2 of long length that is rolled up into a roll 3.

As explained above, the multilayer complex 1 comprises a set of superposed layers 4, including a decorative layer 5, and an expandable layer 6. The embodiment shown also preferably includes a backing layer 7 and a heat-fusible layer 8.

For example, the backing layer 7 is made of paper or is preferably based on a polymer of the polyester type, and more particularly based on polyethylene terephthalate (PET). For example, it is a polyester film sold by Coveme under the trade name KTR 1682 TSL H.

This backing layer 7 may advantageously have antiadhesive or non-stick treatment on its outside face 10, so that it can be detached easily, enabling the multilayer complex 4 to be rolled up into a roll 3 before use, and then to be unrolled easily.

Its other face 9, designed to be facing towards the other layers 4 of the multilayer complex 1, may either be untreated or also be treated to be non-stick. It may also have relief of any motifs for imparting a particular surface appearance to the decorative layer 5 by graining.

Typically, the backing layer 7 has a thickness of about one hundred microns, e.g. in the range 75 to 125 microns, and preferably equal to 100 microns.

The backing layer 7 can be peeled off and replaced subsequently by an adhesive backing layer, preferably put in place on the multilayer complex 1 by rolling. This adhesive backing layer, e.g. made of polyester and having substantially the same thickness as the backing layer 7, has an adhesive inner layer 9 and an outer face 10 that is untreated, or that is preferably treated so as to make it non-stick.

Such an adhesive inner face 9 advantageously makes it possible to hold the decoration better during the subsequent steps of cutting out and of waste stripping, and thus to guarantee that the various component elements of the decoration are positioned properly relative to one another before and during the heat transfer.

The polyurethane-based layer 5 is situated on the backing layer 7. Since it is designed to be the visible decorative upper layer of the decoration, once the multilayer complex is transferred onto the textile, it is preferably opaque and, for example, white or dyed in the mass. In addition, it may be printable in order to enable varied decorations or markings to be formed, with any multicolored drawing.

The decorative layer 5 is preferably formed from a liquid formulation of polyurethane in a solvent. For example, it may be a polyurethane resin in a toluene-isobutanol solvent, such as the resin marketed by The Dow Chemical Company under the name Vithane 659.

That formulation solidifies after a baking step, during which the solvent evaporates, so as to become a very fine flexible plastic layer that forms a surface film. The decorative layer 5 thus preferably has a thickness of in the range 20 microns to 30 microns.

A non-limiting example of an appropriate formulation for the decorative layer based on polyurethane is given below, the various components being referred to by their trade names, and the quantities being given in parts by weight:

| | |
|---|---|
| Vithane 659 | 80 |
| Methoxypropanol | 25 |
| Vithane S20 | 0.15 |
| White Norene | 25 |

The decorative layer 5 obtained from that formulation advantageously has good compatibility with polyvinyl chloride and high opacity.

The expandable layer 6 is situated on the decorative layer 5. It is made of a polyvinyl chloride (PVC) plastisol 11 and includes a heat-expandable agent 12 that is in its non-expanded state.

Polyvinyl chloride plastisol 11 is a paste obtained by colloidal dispersion of a polyvinyl chloride resin in powder form in a liquid plasticizer. It gels upon baking during an irreversible gelation process.

The heat-expandable agent 12 is preferably formed of thermoplastic microspheres that are expandable upon application of heat within a temperature range called expansion temperature range. These microspheres are hollow spheres delimited by thermoplastic casings encapsulating a gas. When they are heated to a temperature lying in the expansion temperature range, said casings soften and the gas pressure increases, thereby causing expansion of the microspheres.

In order for the heat-expandable agent 12 to remain non-expanded in the polyvinyl chloride plastisol 11 that is in the gelled state in the expandable layer 6 of the multilayer complex 1 of the invention, it is important to choose an expandable agent having an expansion temperature range greater than, or at least mainly greater than, the gelling temperature of the chosen plastisol.

Preferably, a plastisol having a low gelling temperature is therefore chosen.

For that purpose, a polymer resin having a low K value is chosen, thereby facilitating gelling at low temperatures. For example, the PVC resin used is the resin sold under the name Solvin 360NA by Solvay and that has a K value equal to 60.

Similarly, a plasticizer is chosen that makes low-temperature gelling possible. For example, the plasticizer used is the one sold under the name Eastman 168 plasticizer, sold by the Eastman Chemical Company, and that is a plasticizer for PVC of the di-(2-ethylhexyl) terephthalate type that enables gelling to take place at a temperature of about 150° C.

The chosen microspheres have an expansion temperature range greater than that gelling temperature. For example, said microspheres are the ones sold by Akzo Nobel under the trade name Expancel® DU, and more particularly those sold under the name Expancel® 950DU80.

In a particularly advantageous variant of the invention, the heat-expandable agent 12 is also chosen with an expansion temperature range compatible with the heat transfer temperature at which the multilayer complex 1 is transferred onto a textile 13.

In this patent application, the term "compatible" is used to mean that the expansion temperature range includes a temperature making it possible to transfer the multilayer complex 1 effectively onto a textile 13 by means of a conventional heat transfer press, without damaging either the multilayer complex 1 or the textile 13 onto which it is to be transferred.

When this condition is satisfied, the expansion of the expandable layer 6 advantageously takes place in the heat transfer press simultaneously with the operation of transfer onto the textile 13.

By way of non-limiting example, a particular composition of formulation adapted for forming the expandable layer 6 is given below, the various components being designated by their trade names and the quantities being given in parts by weight:

| | |
|---|---|
| Solvin 360 NA | 100 |
| Eastman 168 plasticizer | 55 |
| Lastab DE 171 (additive for PVC Ba/Zn sold by Lamberti S.p.A.) | 1 |
| Expancel 950 DU 80/Eastman 168 | 25 |
| Red impasted pigment | 6 |

Above the expandable layer 6, the multilayer complex 1 shown includes a heat-fusible layer 8 that serves to adhesively bond the multilayer complex 1 to the textile 13 while said complex is being heat-transferred.

The heat-fusible layer is made of a polymer, e.g. of the co-polyester, polyurethane, or some analogous type, and preferably of the co-polyester type. For example, its melting point is about 130° C. and its thickness preferably lies in the range 40 microns to 80 microns, and more preferably in the vicinity of 60 microns.

Although not shown, the multilayer complex may also include an opacifying layer interposed between the decorative layer and the expandable layer or placed under the expandable layer, the function of the opacifying layer being to prevent the color of the decorative layer or of the expandable layer being disturbed by the color of the expandable layer or of the textile respectively. Typically, this opacifying layer has a thickness of about a few tens of microns, and its thickness is typically in the vicinity of 30 microns.

Figure 3:
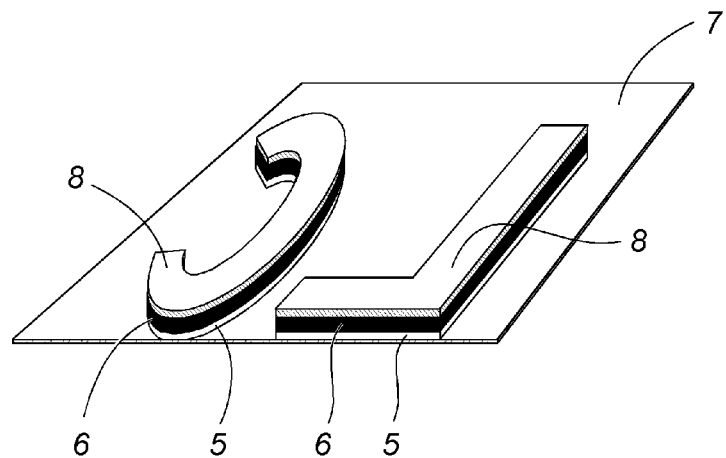
FIG. 3 is a perspective view of a sample of the multilayer complex of FIG. 1, as prepared for being transferred onto a textile.
Figure 4:
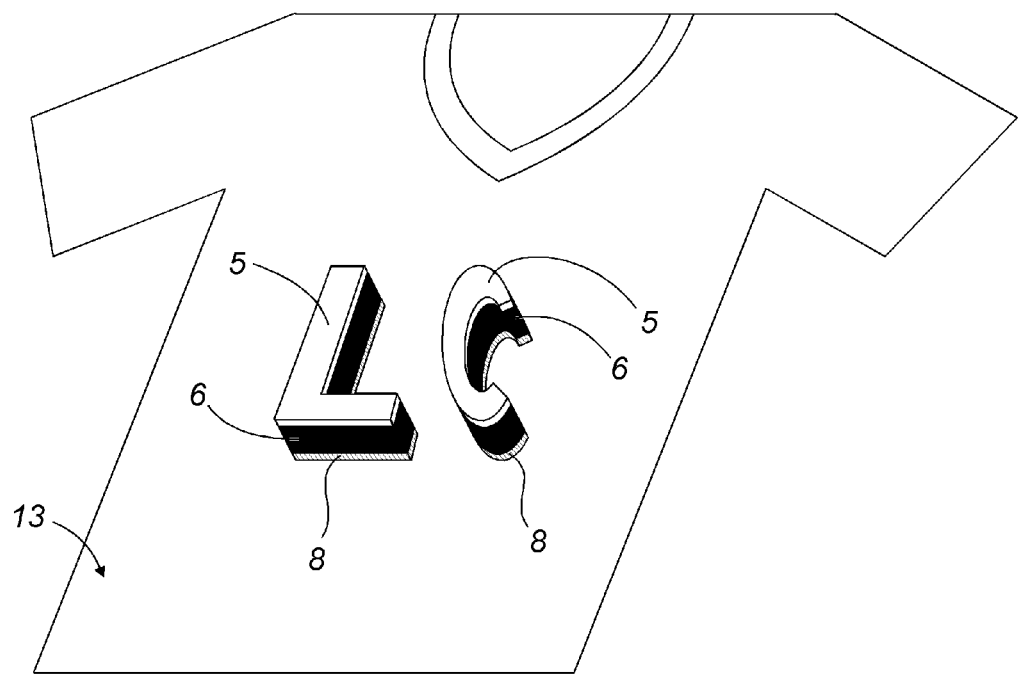
FIG. 4 is a perspective view of a textile article after the sample of FIG. 3 has been transferred onto it.

This multilayer complex 1 can easily be transferred onto a textile 13 of any type whatsoever, as shown in FIGS. 3 and 4 that show an example of the transfer method of the invention.

Before it is transferred, the complex is firstly prepared in such a manner that it has the shape or the motif of the marking or of the decoration to be formed on the textile 13.

For that purpose, the conventional steps of preparing a decoration for transfer may be performed. For example, any lettering or any motif may be cut out, e.g. by means of a digital plotter, and the waste may be stripped from the cutout motif, such waste stripping consisting in removing the waste of the multilayer complex that are not part of the motif to be transferred.

When the decoration to be transferred includes a plurality of elements detached from one another (a plurality of letters, for example), the backing layer 7 is preferably left intact during the cutting out, in order to facilitate the transfer by guaranteeing that the detached elements are positioned properly relative to one another.

An example of a prepared decoration, formed from the multilayer complex 1, is shown in FIG. 3.

A variant of the multilayer complex 1 that is more specifically designed to be printed may also be considered.

In this situation, the backing layer 7 is removed during manufacture, in order to reveal the decorative layer 5 that is to constitute the visible upper face of the decoration after transfer.

An additional backing layer is then added, preferably by rolling, onto the other face of the multilayer complex 1, i.e. on the same side as the heat-fusible layer 8. This additional backing layer is preferably made of a material having affinity with the heat-fusible layer 8, and, for example, it is made of polyester. Its faces may be left untreated or else its outer face may be provided with anti-adhesive treatment.

Before being transferred to a textile 13, this multilayer complex is prepared as described above in order to impart to it the shape or the motif of the marking or of the decoration to be formed. In this example, the decoration is prepared via the other side of the multilayer complex 1, which is turned over relative to the above example.

In this example, preparation includes a step of printing a motif on the layer 5 based on polyurethane, that is printable by means of a printer of the ink jet type.

The decoration is then cut out around the printing, the additional backing layer being left intact in order to maintain the relative positioning of the various elements of the decoration after cutting out.

The cut-out decoration is then conventionally waste-stripped, and then it is covered with an adhesive film or tape making it possible to hold the cut-out decoration in order to remove the additional backing layer and serving as backing for the transfer.

Once the decoration is prepared, it is placed on the visible front face of a textile 13, e.g. a T-shirt as shown in FIG. 4, in such a manner that its heat-fusible layer 8 is in contact with the front face of the textile and that its decorative layer 5 based on polyurethane is the layer that is further away from the textile in order to constitute the visible upper layer of the marking to be formed on the visible front face of the textile 13.

The textile 13 used may be of any type and of any material. For example, it may be a woven, knitted, or non-woven textile, and, for example, be composed of cotton, acrylic, polyester, wool, silk, linen, or non-woven velvet.

The resulting assembly is then placed in a heater platen press for transferring onto the textile, so as to apply to it temperature and pressure conditions that cause the heat-fusible layer 8 to fuse and thus the decoration to adhere to the surface of the visible front face of the textile 13.

Simultaneously, the expandable agent 12 contained in the expandable layer 6 swells and causes the expandable layer 6 to expand, thereby increasing its thickness significantly.

Pressing onto the textile takes place, for example at a temperature of 160° C. and at a pressure of 2 bars, for a duration of 20 seconds.

The expandable layer 6 becomes visible over the edge face of the three-dimensional decoration, and thus at the border of the motif formed or printed on the decorative layer 5 visible on the upper face of the decoration. When the two layers 5 and 6 are of different colors, this results in a visual border effect that imparts relief to the main motif printed on or formed by the upper decorative layer 5.

By means of the invention, a three-dimensional relief effect is obtained for the decoration, and that effect may be reinforced by a two-color effect in the thickness of the decoration.

Figure 5:
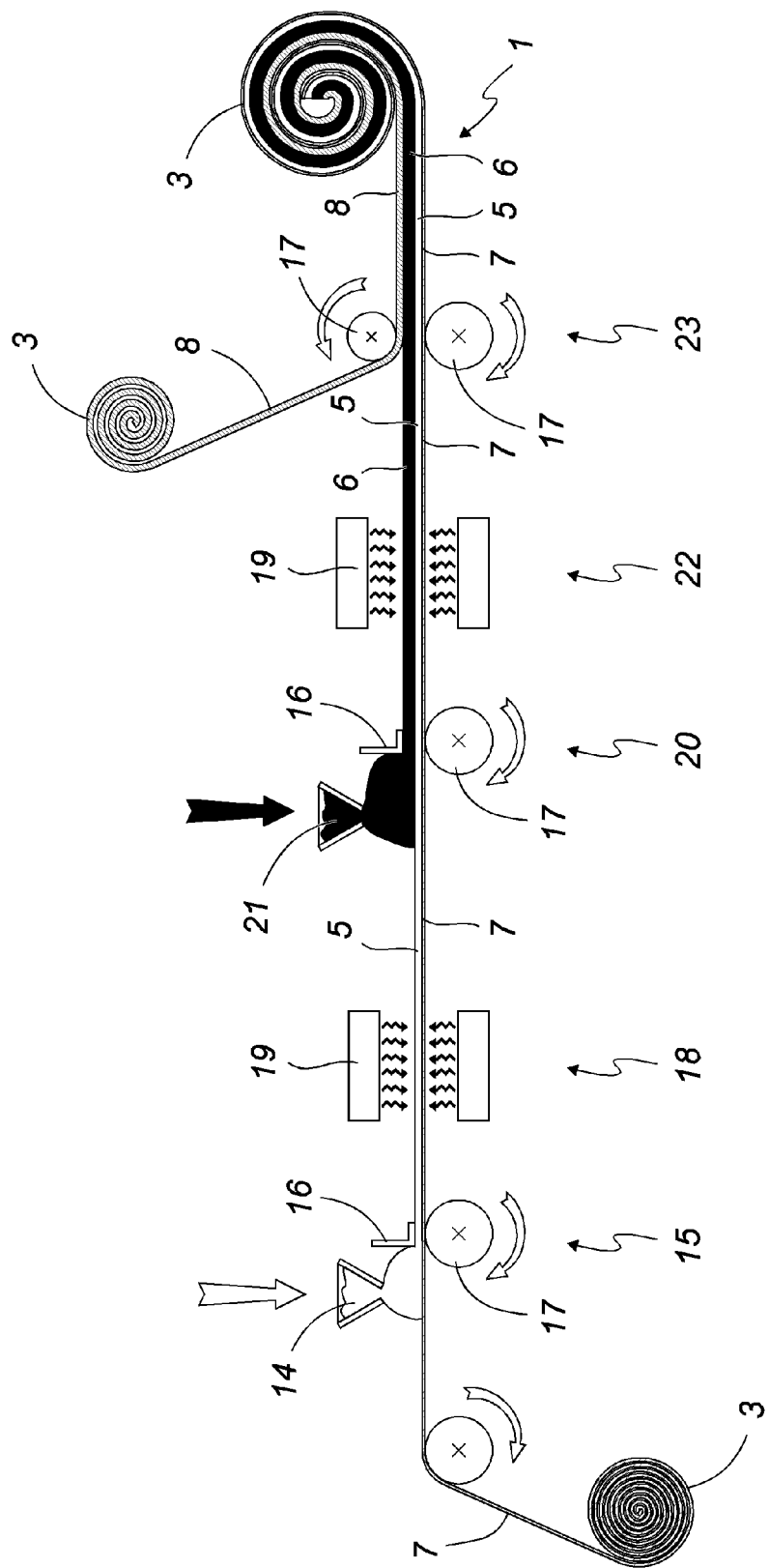
FIG. 5 is a diagrammatic view showing the principle of an example of a manufacturing unit for manufacturing the multilayer complex of FIG. 1.

In order to illustrate the invention better, an example of a method of manufacturing a multilayer complex 1 is described below, with reference to FIG. 5 that diagrammatically shows a unit for continuously manufacturing said multilayer complex. Naturally, separate and independent stations are also possible for each of or for some of the steps.

To begin with, a strip of backing layer 7 is caused to advance that has first been unrolled if it is purchased packaged in a roll 3 as shown.

A solution based on polyurethane 14 is then deposited on said backing layer 7 by coating in a first coating station 15. The spreading of this polyurethane-based solution and the thickness of the layer of solution formed may advantageously be set by means of a doctor blade 16 adjusted relative to a cylinder 17. It is thus possible, for example, to deposit said solution in a quantity lying in the vicinity of 30 grams of dry matter per square meter.

The strip then arrives at a baking station 18, where it passes through an oven 19 that heats the polyurethane-based solution 14 so as to evaporate the solvent and thus so as to form the decorative polyurethane-based layer 5 on the backing layer 7.

After a small amount of cooling, making it possible to ensure that the strip is at a temperature lower than the expansion temperature range of the expandable agent 12, said strip arrives at a second coating station 20, at which a paste 21 composed of a mixture of non-gelled PVC plastisol and of non-expanded heat-expandable agent is deposited on the decorative layer 5. In this example too, the quantity of material deposited, its spreading and the thickness of the resulting layer may advantageously be set by means of a doctor blade 16 adjusted relative to a cylinder 17. For example, it is thus possible to deposit said paste in a quantity corresponding to about 360 grams per square meter.

The strip then arrives at a gelling station 22 where another oven 19 is situated that heats the polyvinyl chloride plastisol to its gelling temperature, but without reaching the expansion temperature range of the expandable agent that it contains. The expandable layer 6, containing a gelled polyvinyl chloride plastisol and a non-expanded heat-expandable agent, is thus formed on the decorative layer 5.

A last station, the rolling station 23, makes it possible, by rolling between two cylinders 17, to apply the heat-fusible layer 8, as unrolled from a roll 3, onto the expandable layer 6.

At the outlet of this station, the multilayer complex 1 of FIG. 1 is obtained. Said complex is preferably rolled up into a reel or a roll 3 with a view to being stored and sold.

Naturally, the manufacturing method and therefore the manufacturing unit enabling the method to be implemented are modified as a function of the specific structure of the multilayer complex to be manufactured in such a manner as to adapt to the type, to the number, and to the order of its layers 4.

Thus, for example, if it is desired to manufacture a multilayer complex that is specifically designed to be printed, the above-described manufacturing method is supplemented by an unmolding step consisting in peeling off and removing the backing layer 7 from the decorative layer 5.

This unmolding step is followed by a rolling step preferably performed on a slightly heated calender that makes it possible to apply and to fasten the additional backing layer to the heat-fusible layer 8.

Clearly, the invention is not limited to the preferred embodiments described above and shown in the various figures, it being possible for the person skilled in the art to make numerous modifications to these embodiments and to imagine other variants without going beyond either the scope or the ambit of the invention as defined by the claims.

The invention claimed is:

1. Heat transfer method for transferring onto a textile (13) a multilayer complex (1) formed of a plurality of superposed thermoplastic layers (4), including a layer (5) based on polyurethane, and an expandable layer (6) containing a gelled polyvinyl chloride plastisol (11) and a non-expanded heat-expandable agent (12), in order to form a marking or a decoration on said textile (13), said method comprising the steps of:
   placing the multilayer complex (1) on the visible front face of the textile (13), the polyurethane-based layer (5) of the complex (1) being the layer that is the furthest away from the textile (13) so that, after transfer, the layer (5) constitutes a visible decorative layer on the visible front face of the textile (13); and
   applying temperature and pressure conditions that cause the multilayer complex (1) to adhere to the visible front face of the textile (13) and simultaneously cause the expandable layer (6) of the complex (1) to expand.

2. Transfer method according to claim 1, wherein a multilayer complex (1) is used in which the polyurethane-based layer (5) and the expandable layer (6) are of two different colors so as to create a border effect around the decorative layer, visible on the front face of the textile (13) once the expandable layer (6) has expanded.

3. Transfer method according to claim 1, wherein, before the multilayer complex (1) is placed on the visible front face of the textile (13), it is prepared such that it has the shape or the motif of the marking or of the decoration to be formed on the textile (13).

4. Transfer method according to claim 3, wherein the step of preparing the multilayer complex (1) comprises at least one operation chosen from among the following operations: printing a motif on the polyurethane-based layer (5), cutting out, or waste stripping.

5. Transfer method according to claim 1, wherein said temperature and pressure conditions are obtained by means of a heater platen press for performing transfer onto textiles.

6. Transfer method according to claim 1, wherein:
   said temperature and pressure conditions correspond to a temperature lying in the range 160° C. to 170° C. and to a pressure in the vicinity of two bars, and
   the temperature and the pressure are applied for a duration lying in the range 10 seconds to 30 seconds.

7. Multilayer complex (1) that is heat-transferable onto the visible front face of a textile (13) by a transfer method according to claim 1, said complex being formed of a plurality of superposed thermoplastic layers (4) and comprising:
   a polyurethane-based layer (5) designed to be the visible upper decorative layer, once the multilayer complex (1) has been transferred onto the visible front face of the textile (13); and
   an expandable layer (6), containing a gelled polyvinyl chloride plastisol (11) and a non-expanded heat-expandable agent (12),
      wherein the polyurethane-based layer (5) and the expandable layer (6) are of two different colors so as to create a border effect around the decorative layer (5) once the expandable layer (6) has expanded.

8. Multilayer complex (1) according to claim 7, wherein the polyurethane-based layer (5) is at least one of opaque, dyed, or printable.

9. Multilayer complex (1) according to claim 7, wherein the heat-expandable agent (12) comprises microspheres constituted by thermoplastic casings enclosing a gas.

10. Multilayer complex (1) according to claim 7, wherein the expansion temperature range of the heat-expandable agent (12) comprises a heat transfer temperature at which the multilayer complex (1) is transferred onto a textile (13).

11. Multilayer complex (1) according to claim 7, wherein the complex (1) further comprises one or more layers (4) chosen from among at least one of: a heat-fusible layer (8), a backing layer (7), or an opacifying layer.

12. Multilayer complex (1) according to claim 7, wherein the complex (1) comprises a heat-fusible layer (8) based on either a co-polyester or on polyurethane.

13. Multilayer complex (1) according to claim 7, wherein the complex (1) comprises a backing layer (7) based on polyester and treated to be non-stick.

* * * * *